July 22, 1969  F. D. SOLOMON  3,456,275
SENSING AND POSITIONING CONTROL MECHANISM FOR
A CAR WASHING BRUSH
Filed Feb. 7, 1968  3 Sheets-Sheet 2
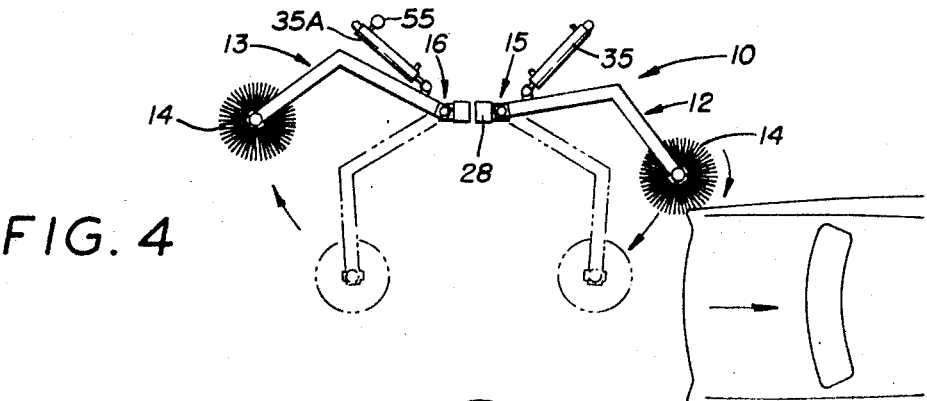
FIG. 4
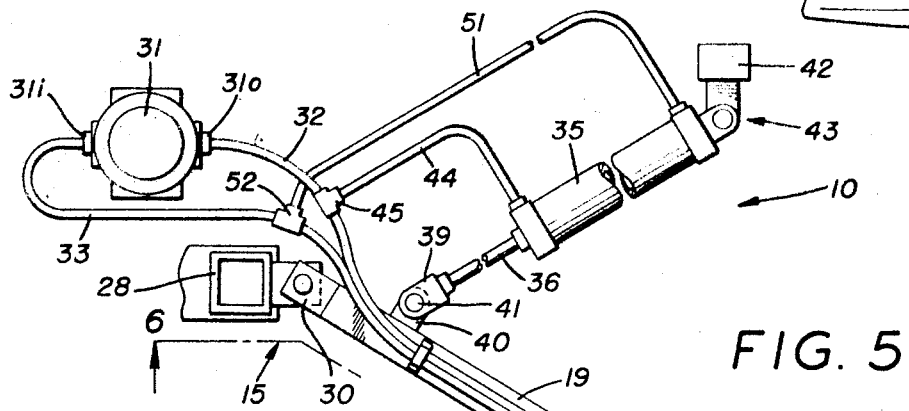
FIG. 5
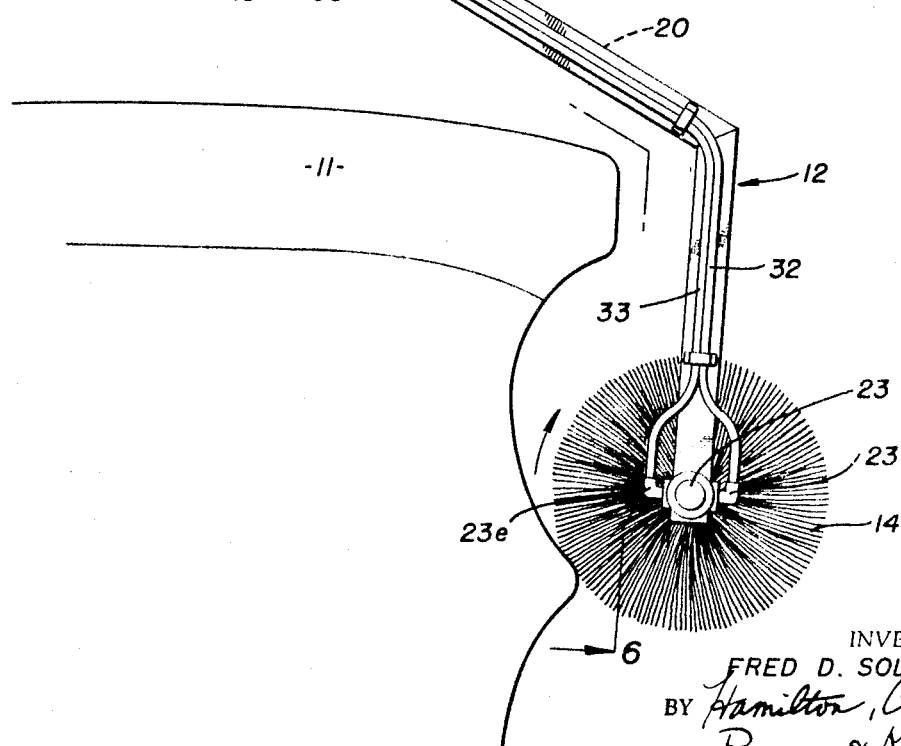
INVENTOR.
FRED D. SOLOMON
BY Hamilton, Cook,
Renner & Kenner
ATTORNEYS July 22, 1969

F. D. SOLOMON 3,456,275

SENSING AND POSITIONING CONTROL MECHANISM FOR
A CAR WASHING BRUSH

Filed Feb. 7, 1968

INVENTOR.
FRED D. SOLOMON
BY Hamilton, Cook,
Renner & Kenner
ATTORNEYS

United States Patent Office 3,456,275
Patented July 22, 1969

3,456,275
SENSING AND POSITIONING CONTROL MECHANISM FOR A CAR WASHING BRUSH
Fred D. Solomon, Akron, Ohio, assignor to Lanning Equipment Corp., Akron, Ohio, a corporation of Ohio
Filed Feb. 7, 1968, Ser. No. 703,694
Int. Cl. A46b 13/00; B60s 3/00
U.S. Cl. 15—21                                  6 Claims

ABSTRACT OF THE DISCLOSURE

A mechanism for sensing and controlling the position of a brush as used in automatic car washes. The brush is rotatably mounted on a support frame that is movable toward and away from the auto being washed by a cylinder means. Rotation of the brush is effected by a fluid motor, and the pressure differential between the input and return fluid conduits connected to the fluid motor actuates a double acting piston in the cylinder means to move the support frame toward and away from the auto. Variations between the pressures in the aforesaid input and return conduits act against opposed piston faces of unequal working area on the double-acting piston precisely to sense and control the position of the brush with respect to the vehicle being washed.

BACKGROUND OF THE INVENTION

Automatic car washing systems are generally of two types. In one type the automobile is parked in a stationary position, and the washing mechanism traverses the extent of the auto, often making several passes to complete the job. In a second type system the washing mechanism is fixed, and the automobile is propelled therethrough at a predetermined speed, the speed and spacing of successive automobiles through the washing mechanism being controlled by the utilization of some type conveyor mechanism. The present invention relates to a mechanism for sensing and controlling the position of washing brushes as may be used by either system. Although this mechanism shall only be described in conjunction with the second type system, adaptations of the present concept can also be employed by those skilled in the art to the first type system.

To clean the front, sides and rear of a vehicle, and particularly that area beneath the windows, most prior art automatic car washing systems of the second type employ "wrap-around" brushes. Most prior known arrangements employ two "wrap-around" brush units, one unit for each side of the car. A typical "wrap-around" brush unit employs a pair of vertically disposed brushes. These "wrap-around" brushes are longitudinally spaced, each brush being carried on an individual support frame. The support frames are oppositely disposed and movable through horizontal arcs.

The brush carried on one support frame washes a portion of the front and one side of the auto, and the brush on the second frame in said unit also washes that side and a portion of the rear of the auto. That frame which supports the brush for washing the front of the vehicle swings along an arcuate quadrant in the same general direction that the vehicle is being propelled through the washing mechanism so that as the auto moves forwardly the brush will have a component of forward motion to accommodate the forward movement of the vehicle and at the same time a component of lateral movement to wash laterally across the front of the vehicle.

That frame which supports the brush for washing the rear of the vehicle is mounted in opposition to the support frame for the front brush and similarly provides components of forward and lateral movement to accomplish a washing of the rear of the vehicle as it traverses through the washing mechanism.

In most prior known arrangements of this type the brush that washes the front is predisposed, by the biasing action of an air cylinder, in the path along which the vehicle will be moved. This brush, which is generally rotatably powered by a fluid motor, is rotated in such a direction that it is self-propelled, or "walked," across the front surface of the car, the air cylinder providing a modest biasing action to hold the brush in contact with the car. As the car moves forwardly against this front brush, the supporting frame on which it is carried is swung laterally by contact of the car against the brush until the frame has swung sufficiently that the brush carried thereon contacts the side of the car. As the front brush reaches approximately this position the support frame on which it is carried actuates an air switch to pressurize a control cylinder that biasingly urges the second support frame of the "wrap-around" unit arcuately outwardly toward the car. The brush carried on this frame also engages the side of the car and as the car moves therepast this rotationally self-propelled brush "walks" along the side and rear contour of the car.

It has been found that the afore-described brush and control system has many deficiencies. The principal deficiency is that such a system cleans unevenly—even the normal irregularities, such as grill recesses and bumper protrusions, on the surface of the car being washed by such a brush system cause the brush to clean unevenly. For example, if the air pressure in the biasing cylinder is too low the brush will be too slow in following contours which extend away from the brush. And, if the air pressure is too high, the brush will dig into contours that extend toward the brush and then jump completely out of contact with the car. Nor is there a compromise air pressure because of the wide variety of contours presented by cars of various makes and vintage.

The problem is most pronounced when the car being washed is of the modern type having sides which project forwardly of the front of the car in what are generally termed "front fins." Not only do the brushes tend to miss cleaning the fillet-like recess between the front of the car and the inboard side of these fins, but also, as a self-propelled brush makes contact with the inboard side of such a fin, it tends, first, to engage the fin quite heavily and then jumped around the fin and onto the side of the car. This, of course, leaves the entire fin structure unwashed.

Moreover, when the brush is rotated to "walk" across and along the auto, the bristles of that brush and the car surface contacted thereby are moving in the same direction with respect to each other. This correspondence of direction minimizes the scrubbing action and does not afford the optimum cleaning results. Although the disadvantages of the prior positioning and control mechanism are pointedly demonstrated by the operation of the "wrap-around" brushes, these same disadvantages also exist with the many other brushes in a car washing system.

SUMMARY OF THE INVENTION

It is therefore a primary object of the present invention to provide a brush positioning and control mechanism for a car wash that will maintain the brush against the vehicle being washed with a substantially uniform pressure.

It is another object of the present invention to provide a brush positioning and control mechanism, as above, which eliminates the necessity for rotating the brush to "walk" along the auto and thus permit the brush to rotate such that the bristles will move in a direction opposite to the movement of the vehicle surface being scrubbed thereby.

It is a further object of the present invention to provide a brush positioning and control mechanism, as above, which will not allow the brush to jump around protuberances but to follow the contours more precisely so as to provide a thorough cleaning of the automobile.

It is a still further object of the present invention to provide a brush positioning and control mechanism, as above, which is responsive to the load on the fluid motor rotating the brush, and therefore the resistance met by the brush itself, to sense and control the brush position.

These and other objects of the invention, as well as the advantages thereof over existing prior art forms, will become apparent from the following detailed description of the attached drawings and are accomplished by means hereinafter described and claimed.

In general, a positioning and sensing mechanism constructed according to the concept of the present invention utilizes the pressure differential of the driving fluid across the fluid motor that rotates the cleaning brush both to sense and control the position of the brush with respect to the vehicle it is scrubbing. The rotating brush is mounted on a support frame that is movable toward and away from the vehicle. This movement is effected by a double-acting piston. The opposed faces on the piston have unequal effective, or working, areas. That face having the lesser working area communicates with the higher pressure side of the motor, and that face having the greater area communicates with the lower pressure side of the fluid motor. The pressure against the piston face of lesser area moves the support frame so as to translate the brush away from the vehicle, and the pressure against the piston face of greater area moves the support frame so as to translate the brush toward the vehicle. Inasmuch as the frictional contact of the brush with the vehicle results in a pressure differential across the fluid motor proportional to the magnitude of its frictional resistance, the support frame moves to maintain the brush at a constant degree of frictional contact with the vehicle.

One preferred embodiment of the present invention is shown by way of example in the accompanying drawings and is described in detail without attempting to show all of the various forms and modifications in which the invention might be embodied; the invention being measured by the appended claims and not by the details of the specification.

DESCRIPTION OF THE DRAWINGS

FIG. 4 is a schematic plan similar to FIGS. 1 through 3 depicting the first brush as it swings from contact (solid line) with the vehicle just washed into the ready position (chain line) for a second vehicle and the second brush retracted from its outermost position (chain line), in the path of the next vehicle, to its retracted, or ready, position (solid line);

FIG. 5 is an enlarged top plan of the first brush and support frame embodying the subject control as the brush makes initial contact with the front of a vehicle being washed;

DESCRIPTION OF A PREFERRED EMBODIMENT

Figure 1:
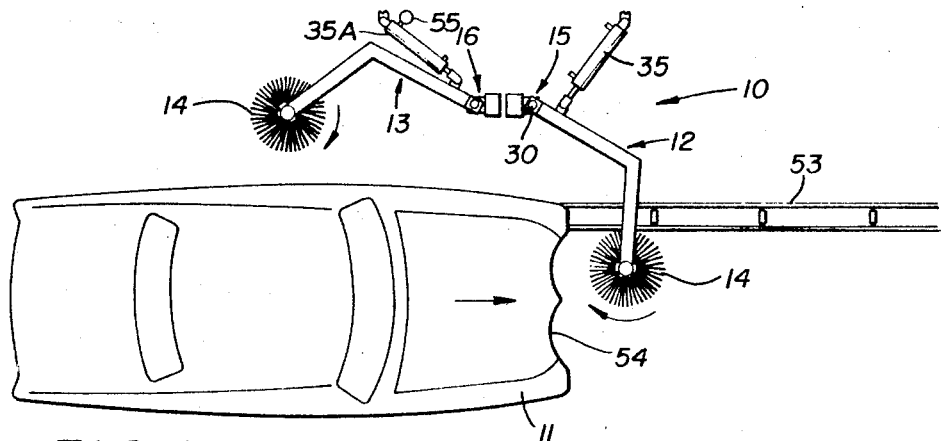
FIG. 1 is a schematic top plan of a "wrap-around" brush unit for cleaning at least a portion of the front and rear of a vehicle as well as one side thereof, said unit employing a control mechanism in accordance with the concept of the present invention and depicted in the ready, or receiving, position just prior contact with the vehicle to be washed thereby.

A typical embodiment of a positioning and control mechanism constructed in accordance with the concept of the present invention is indicated generally by the numeral 10 on the attached drawings. The positioning and control mechanism 10 is depicted in conjunction with a "wrap-around" brush arrangement but it must be noted that the concept of the present invention is not limited to the sensing and controlling of the position of "wrap-around" brushes but is equally adaptable to the other brushes in automatic car washing systems.

In a "wrap-around" arrangement a pair of opposed support frames are mounted for horizontal swinging movement on each side of the vehicle 11 being washed. However, inasmuch as the concept by which the control mechanism for each side operates is generally identical, a "wrap-around" unit for only one side has been depicted in FIGS. 1 through 4. The opposed support frames 12 and 13 for the "wrap-around" unit shown each carry a brush 14, and each is pivotally mounted, as generally indicated at 15 and 16, respectively.

Figure 6:
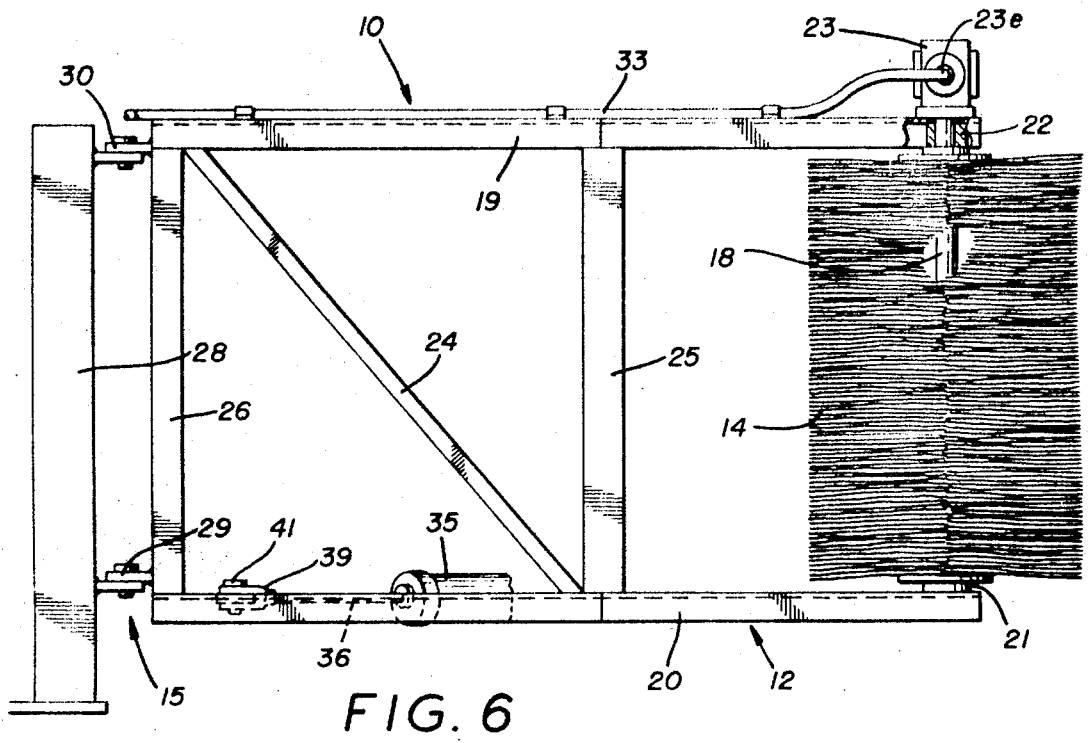
FIG. 6 is an elevation taken substantially on line 6—6 of FIG. 5 with the brush partially broken away; and, FIG. 7 is a schematic representation of the piping employed by a sensing and positioning mechanism according to the concept of the present invention and showing the cylinder means used in conjunction therewith in longitudinal section.

Referring more particularly to FIGS. 5 and 6, the brush 14 is carried on a shaft 18 rotatably mounted between the vertically spaced, horizontal arms 19 and 20 of the support frame 12. While the lower end of the shaft 18 is received in a blind journal 21 carried on lower arm 20, the upper end of the shaft 18 extends through a cylindrical journal 22 carried on the upper arm 19 and is connected to a fluid motor 23.

The arms 19 and 20 are dog-legged to clear the corner of the vehicle as the brush 14 engages the front thereof, as depicted in FIG. 5, and suitable cross braces 24 and 25 (FIG. 6) rigidify the arms 19 and 20 into a unitary support frame 12. A rear post 26 extends vertically between the arms 19 and 20. The rear post 26 is connected to a stile 28 by hinge means 15 comprising a pair of individual hinges 29 and 30 to permit the frame 12 to be swung along the lateral arc more fully described in conjunction with the operational explanation hereinafter presented in conjunction with FIGS. 1–4.

Figure 7:
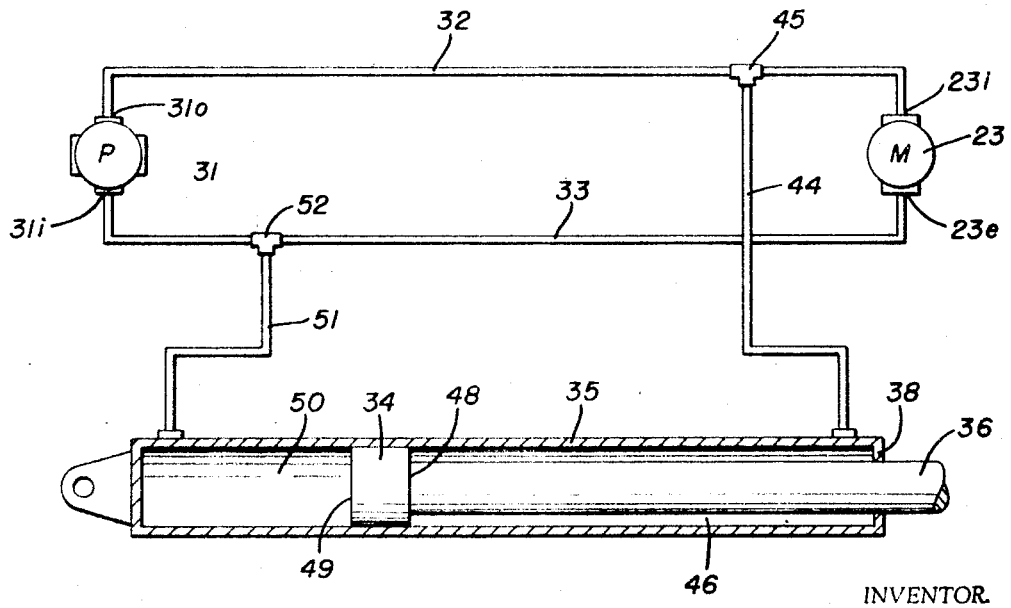

The fluid motor 23, by which brush 14 is rotated, is powered by a pump 31 that may be located remotely therefrom (FIG. 7). Pressurized fluid is conducted from the output side 31*o* of pump 31 to the input side 23*i* of motor 23 by an input conduit 32, and a return or exhaust, conduit 33 connects the exhaust side 23*e* of motor 23 to the input side 31*i* of the pump 31. The pressure differential between the input and return conduits 32 and 33, respectively, across motors 23 functions both as a position sensing means and a position control means.

As shown FIG. 7, a double-acting control piston 34 is reciprocally slidable within an operating cylinder 35. A piston rod 36 is connected, at one end, to the piston 34 and extends outwardly through the end wall 38, (and suitable sealing means, not shown) of the cylinder 35. The other end of rod 36 is pivotally attached to the supporting frame 12 (FIG. 5)—a clevis 39 on the outermost end of rod 36 being pivotally connected to an anchor tab 40 on the lower arm 20 of frame 12 by a pin 41. The cylinder 35 is itself pivotally mounted from a fixed support, such as post 42, by a similar pin connection indicated generally by the numeral 43.

Referring more particularly to FIGS. 5 and 7, a first lateral conduit 44 taps into the input conduit 32, as by a T-connection 45, and communicates with the high pressure chamber 46 in cylinder 35. The high pressure chamber 46 is that chamber exposed to the face 48 of piston 34 to which the rod 36 is attached. The opposite face 49 of the double-acting piston 34 is exposed to the low pressure chamber 50 in cylinder 35. A second lateral conduit 51 taps into the return conduit 33, as by a T-connection 52, and communicates with the low pressure chamber 50.

To assure that the present concept is fully understood, a brief description of the operation of the present control system will be hereinafter set forth.

With the pump 31 operating, fluid is pumped outwardly via conduit 32, through motor 23, and returns via conduit 33. Because of the present control system, the motor 23 may rotate the brush 14 such that the bristles thereof move in a direction opposite to the movement of the vehicle's surface being scrubbed thereby. As shown by the arrow in FIG. 5, the brush 14 may thus be rotated in a clockwise direction.

Under the "no load" condition—i.e., when the motor 23 is turning the brush 14 against no external resistance—there is relatively little pressure drop across the motor. Experiments have shown that for a typical "wrap-around" brush the pressure in input conduit 32 may be on the order of 475 pounds per square inch and the pressure in the return line 33 on the order of 325 pounds per square inch under a "no load" condition. Yet, as soon as external resistance is applied to the brush 14 the back pressure in the input line 32 will immediately increase and the pressure in the return line 33 will decrease. Thus, under a "washing load" the pressure differential increases. Again, experience with the same type brush for which the above pressures were given indicates that the pressure in the input conduit 32 may raise to 650 pounds per square inch and the pressure in the return line 33 may drop to 275 pounds per square inch under the resistance offered by a "washing load" that is acceptable, though slightly on the high side. That is, under these pressures the brush 14 will scrub the vehicle without deleterious effects. Should too much more resistance be encountered, the brush might abrade the finish or break protuberances such as the decorative chrome, external mirrors, aerials and the like.

By determining the pressure parameters for any type brush installation one may select the relative areas of the working faces 48 and 49 on piston 34 to provide the desired control to the positioning of the brush 14 with the pressure differential across the motor 23 acting as the sensor.

With the pressure parameters set forth above, the provision of working faces having an area ratio of approximately 2½ to 1 works quite well. For example, if the face 49 has a diameter of 1¼ inches and the piston rod 36 has a diameter of 1" this ratio obtains. As such, under the no load condition the effective force on piston face 49 will exceed the effective force on piston face 48 and the piston 34 will be moved to protract the rod 36 and swing the frame 12 into the path of the vehicle 11, as shown in FIG. 1.

As the vehicle 11 is moved along its path by the tire engaging conveyor 53 the front 54 thereof will contact the brush 14. As the front 54 is moved against the brush 14 the frictional contact therebetween increases the load on the motor 23 and a corresponding increase in the pressure drop across conduits 32 and 33 occurs. This pressure differential is immediately reflected by the forces applied to the opposed working faces 48 and 49 on piston 34. When the pressure differential increases to a point determined by the ratio of their respective areas the force on work face 48 exceeds the force on face 49 and the piston will be moved to retract piston rod 36. The retraction of rod 36 tends to swing the frame 12 to move the brush 14 arcuately away from the front 54 of auto 11. However, as soon as the brush is moved sufficiently away from front 54 so that the frictional contact therebetween is reduced this will be immediately reflected by a lessening of the pressure differential across the motor 23 and the corresponding forces on the opposed work faces of piston 34. The brush will, therefore, be continuously moving toward and away from the vehicle in response to the frictional contact therebetween.

This "hunting," or "bracketing," movement of the brush is of nominal dimension and results in the application of a substantially uniform washing pressure against the vehicle, with the retraction of the upport frame 12 being controlled solely by the relative frictional load on the brush 14.

The arcuate movement of the support frame 12 accommodates both the longitudinal movement of the vehicle 11 as it is moved along the conveyor 53 and the lateral movement necessary to wash across the front 54 of the car. As should now be appreciated, the brush will maintain, by the "bracketing" action of frame 12, a constant scrubbing pressure irrespective of the contour across which the brush is moving. And, equally as important, this constancy does not require, or depend upon, a particular rotational direction for the brush 14.

Figure 2:
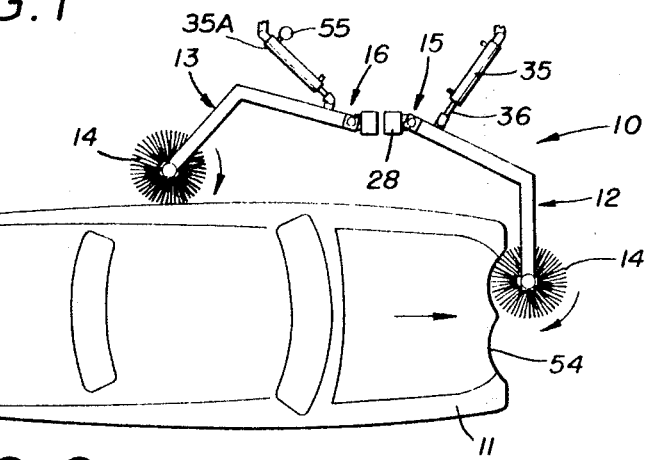
FIG. 2 is a schematic plan similar to FIG. 1 depicting the "wrap-around" unit shortly after the vehicle makes contact therewith, the first brush depicted scrubbing the front of the vehicle and the second brush depicted scrubbing the side thereof.
Figure 3:
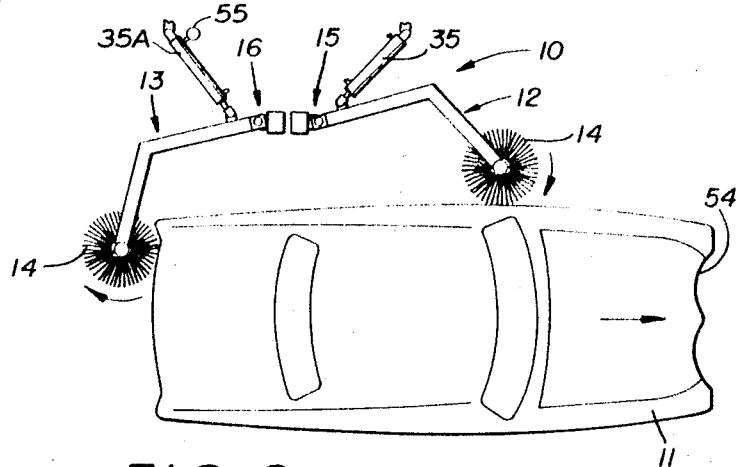
FIG. 3 is a schematic plan similar to FIGS. 1 and 2 depicting the first brush scrubbing the side of the vehicle and the second brush scrubbing the rear thereof.

To complete the exemplary reference to a "wrap-around" brush unit it should be noted that the support frame 13 may also be operated by the present control system. In fact, an identical operating cylinder connected to the input and return conduits of a motor operating the brush 14 on frame 13 will provide the desired results. The only difference is that the frame 13 must be retracted until at least the front 54 of the vehicle 11 has been moved past the brush 14 thereon. This is accomplished by a control valve 55 which regulates the communication of fluid to the low pressure chamber in the operating cylinder 35A. For example, by restricting the pressure to that chamber frame 13 will remain retracted, but if a trip switch, not shown, which is actuated by the presence of the auto, or a trip switch, also not shown, actuated by contact of the brush 14 on arm 12 with the auto operates the control valve 55 to permit communication from the return line of the motor turning the brush 14 on frame 13 to the low pressure chamber of the cylinder 35A operating that frame, the frame 13 will be moved out against the car, as shown in FIG. 2, and will follow the contour thereof, even across the back as shown in FIG. 3, by the same "bracketing" procedure described above. Thus, as the vehicle 11 moves away from the extent to which the frame 13 can swing another trip switch, also not shown, will again close that lateral conduit leading from the return line of the motor operating this second brush to the low pressure chamber in the operating cylinder controlling frame 13, and that frame will retract until the next car is in the position of FIG. 2.

By understanding the operation of the present control mechanism in conjunction with a "wrap-around" brush unit, one skilled in the art should be able to adapt this mechanism to any of the various cleaning brushes employed by automatic car washing systems so that the position of the brush is properly sensed and controlled to afford uniform cleaning. The objects of the invention have thus been achieved.

I claim:

1. A sensing and positioning control for a vehicular washing brush having a support means movable toward and away from the vehicle, a brush rotatably mounted on said support means, fluid motor means to rotate said brush, input means to deliver pressurized fluid to said fluid motor and exhaust means to remove the fluid under reduced pressure from said fluid motor, said control comprising, a double acting piston means connected to move said support means toward and away from the vehicle, means communicating the pressure from said fluid input means to the first working face of said piston means, means communicating the pressure from said fluid exhaust means to the second working face of said piston means, the relative pressures of said input and exhaust means acting on said double acting piston to move said support means toward and away from a vehicle.

2. A control, as set forth in claim 1, in which the pressure against said first working face tends to urge the support means away from said vehicle and the pressure against said second working face tends to urge the support means toward said vehicle.

3. A control, as set forth in claim 2, in which the second working face has a greater area than the first working face.

4. A control, as set forth in claim 1, in which the double acting piston means comprises a cylinder mounted externally of said support means, a piston reciprocally slidable in said cylinder, said piston having first and second opposed working faces, a piston rod, one end of said piston rod connected to the first working face of said piston, the second end of said rod attached to said support means.

5. A control, as set forth in claim 4, in which the piston rod is connected to said first working face such that the second piston face has a greater effective working area than said first piston face.

6. A control, as set forth in claim 5, in which the working area of said second face is approximately 2¼ times the effective working area of said first face.

References Cited
UNITED STATES PATENTS

| | | | |
|---|---|---|---|
| 2,459,902 | 1/1949 | Tucker | 173—8 X |
| 2,513,587 | 7/1950 | Reeves | 15—319 |
| 3,332,098 | 7/1967 | Smith. | |

EDWARD L. ROBERTS, Primary Examiner

U.S. Cl. X.R.

15—319; 60—52; 91—412; 173—8

UNITED STATES PATENT OFFICE
CERTIFICATE OF CORRECTION

Patent No. 3,456,275                                                     July 22, 1969

Fred D. Solomon

It is certified that error appears in the above identified patent and that said Letters Patent are hereby corrected as shown below:

Column 2, line 47, "jumped" should read -- jump --. Column 4, line 60, after "shown" insert -- in --. Column 5, line 51, "2 1/2" should read -- 2 1/4 --; line 52, "1 1/4" should read -- 1 1/2 --.

Signed and sealed this 10th day of February 1970.

(SEAL)
Attest:

Edward M. Fletcher, Jr.                                       WILLIAM E. SCHUYLER, JR.
Attesting Officer                                                       Commissioner of Patents